Patented June 2, 1942

2,284,800

UNITED STATES PATENT OFFICE 2,284,800

ADHESIVE AND METHOD OF MAKING

John W. Close, Lombard, Ill., assignor to United Wall Paper Factories, Inc., Chicago, Ill., a corporation of Delaware No Drawing. Application March 24, 1938, Serial No. 197,960

6 Claims. (Cl. 106—153)

This invention relates to an adhesive which is particularly intended and adapted for use in the wall paper and similar coating industries, while being of general application and utility as an adhesive.

An object of the present invention is to provide an adhesive having a corn protein as its base.

Another object of the present invention is to provide a new and improved adhesive which is especially adapted for use in the wall paper art for securing pigments upon wall paper and without interfering with or changing the color or shade of such pigments.

Another object of this invention is to provide an adhesive which is especially adapted for use in the wall paper and similar coating industries and which can be made water-resistant by the use of substances heretofore known but with greater economy than has been possible heretofore.

An additional object of the present invention is to provide a new and improved dry adhesive base which is adapted to be converted into a novel and efficient liquid adhesive by the addition of water and treatment in the manner hereinafter described.

Other objects will appear hereinafter.

Corn protein material such, for example, as corn-gluten meal, which is used as cattle feed, contains approximately forty to forty-two per cent (40 to 42%) protein, and other corn protein materials have been isolated which contain much larger percentages of protein, and it has been found that these materials provide an excellent base for an adhesive, and that they have the advantage, over other vegetable adhesive bases such, for example, as peanut meal, soya bean meal, etc., in that they can be converted into coatings and printing inks which represent distinct economies in manufacture as well as having distinctly improved properties in use.

It has been found that a large portion of the protein content which is present in such corn derivatives consists of alcohol soluble proteins, known as prolamines, which are quite different in both chemical composition and properties from other vegetable proteins.

It has further been found that the alcohol-soluble proteins or prolamines, which are derived from corn, can be dissolved in a suitable alcohol such, for example, as wood alcohol, and that the solution thus prepared can then be emulsified by means of an alkaline resinate or similar emulsifying agent, and blended with a water solution of suitable pigments or other inert materials.

It has also been found, however, that the procedure outlined in the next preceding paragraph is relatively very expensive or costly from the standpoint of manufacture and is mechanically cumbersome in use. Accordingly, the research which resulted in the present invention was instituted, in part, for the purpose of discovering ways and means of removing the objectionable features which are inherent in the method described in the next preceding paragraph, of utilizing such corn proteins or prolamines as adhesive bases while still retaining the desirable properties of these substances, including their excellent adhesive properties.

In the research and experimental work which led up to the present invention, it was found that corn protein adhesive bases such, for example, as those referred to above, could be put into solution by using consecutively and separately two different solvents or solvent mixtures, that is, the corn protein could be put into solution by first thoroughly mashing the same in a mixture consisting of alcohol and a resin such, for example, as wood rosin, and ammonium hydroxide, whereupon the mixture thus formed could be dissolved in water containing a relatively small amount of alkali. However, it was found that this procedure, while retaining the desired solubility of the prolamines, and being less cumbersome than the objectionable alcohol or double solution method hereinbefore discussed, was still relatively costly and expensive from the standpoint of manufacture, in that the cost of the materials was still relatively high, and the resulting adhesive was too dark in color and would not lend itself readily to being bleached by common bleaching agents.

Further investigation disclosed, however, that the necessity for the use of alcohol could be eliminated entirely, that is, it was found that the corn protein base or meal could readily be put into solution by mixing the same in a mixture of a resin, such, for example, as ordinary wood rosin, and ammonium hydroxide, thus entirely eliminating the need for the use of alcohol as a solvent, in the mixture, and also eliminating the time, labor and expense involved in the cumbersome method of putting the two solvent mixtures, referred to above, together, and it is an object of the present invention to accomplish this result of eliminating entirely the need for the alcohol and the two-stage operation of putting the corn protein into solution, in which alcohol has been employed, and to put the corn protein into solution by means of a single solvent without the use of alcohol, and in a one-stage operation. However, it was then discovered that the resulting adhesive, while lighter than that which resulted from using alcohol as a solvent and satisfactory, in general, could not be used for the purpose for which it was principally intended, namely, in coating and printing wall paper and the like, because it was too dark in color and did not lend itself to being bleached by common bleaching agents, whereas an adhesive or size which is to be used in such industries must be very light in color because of the necessity for using it frequently upon papers which are white or have other light colors or shades thereof.

It was thereupon discovered, however, upon further research, that this dark colored adhesive, consisting, essentially, of a corn protein or meal base, a resin such, for example, as wood rosin, ammonia and water, could readily be bleached by the use of common and familiar bleaching agents which are used in the art such, for example, as a water solution of hydrogen peroxide, ($H_2O_2$), provided the said adhesive mixture or solution were first heated to a temperature of not substantially less than 170° F. nor substantially more than 210° F., after which the objectionable dark color of the adhesive could be removed by subjecting the same to various bleaching agents which are common and well known in the art such, for example, as hydrogen peroxide ($H_2O_2$); it being noted in this connection, that the aforesaid temperature of from approximately 170° F. to approximately 210° F. is not merely arbitrary but has been found by extensive experimentation to be rather critical.

The adhesive solution thus prepared may be used in various ways in the wall paper and other paper coating arts, and in various other ways, such, for example, as a size, but it is principally intended for use as either a liquid or a dry adhesive base for the various and numerous colors and pigments which are used in the wall paper art and such, for example, as various clays, lithopone, titanium dioxide, etc., and when so used has been found to be sufficiently light in color to meet the requirements of such an adhesive and otherwise a very satisfactory adhesive for its intended purpose.

It has also been found that wall paper and other paper coatings and inks prepared in the manner described above, that is, by employing the new adhesive, have superior coating, printing, and drying properties and are relatively much less expensive in manufacture than the prior art materials employing protein adhesives which have been used heretofore.

It has also been found that the new adhesive may be made water-resistant in a manner and by the use of substances which are well known in the art and such, for example, as various aldehydes, metallic salts, and the application of heat.

The following examples represent typical formulae which may be followed in preparing the new adhesive, all parts indicated being by weight, it being understood that the proportions shown are merely illustrative and may be varied considerably:

*Example No. 1*

|  | Parts |
|---|---|
| Water | 30 to 70 |
| Corn-gluten meal | 3 to 8 |
| Wood rosin | 2 to 7 |
| Ammonium hydroxide (26° Bé.) | 1 to 8 |
| Hydrogen peroxide (30%) | 0.1 to 1 |

*Example No. 2*

|  | Parts |
|---|---|
| Water | 30 to 70 |
| Corn-gluten meal | 3 to 8 |
| Wood rosin | 2 to 7 |
| Ammonium hydroxide (26° Bé.) | 1 to 6 |
| Bleaching powder | 0.1 to 2 |

*Example No. 3*

|  | Parts |
|---|---|
| Water | 30 to 70 |
| Corn-gluten meal | 3 to 8 |
| Wood rosin | 2 to 7 |
| Ammonium hydroxide (26° Bé.) | 1 to 6 |
| Sodium hydrosulphite $Na_2S_2O_4$ | 0.1 to 1 |

In preparing the new adhesive according to any of the formulae represented by the foregoing examples, the water, corn-gluten meal and the resin, which may be ordinary wood rosin or other resins, natural or synthetic, and the ammonium hydroxide, are preferably mixed together and the mixture thus formed is then heated to a temperature not substantially less than 170° F. and not substantially greater than 210° F., so as to dissolve the resin in the solution, thus forming a colloidal suspension or emulsion of the corn protein adhesive base in ammonium resinate, and thereby putting the corn protein base in a condition wherein it may be bleached by the use of such bleaching agents which are well known and commonly used in the art, and examples of which have been given in the foregoing examples. The selected bleaching agent or agents are then added to the ammonium resinate adhesive emulsion, and if the adhesive is intended for use in the wall paper or analogous paper-coating arts, suitable coating, coloring, or printing materials, such as those which will be referred to hereinafter may be added.

It will then be found that the objectionable dark color of the corn protein adhesive base composition may thereupon be removed by the bleaching agent and the composition thus rendered especially satisfactory for use in the wall paper and analogous paper coating arts in which it could not be used except for the heat treatment of the adhesive base and its suspension in an alkaline resinate, in the manner which has been described hereinbefore, as well as being adapted for use as an adhesive, in general.

The new adhesive, prepared in the manner described above, and according to any of the foregoing formulae, may be used, and is especially adapted to be used, in conjunction with various coating, coloring and printing materials which are well known and in common use in the wall paper and allied paper coating arts, as well as in the various other ways in which an adhesive may be used. Thus, for example, to the adhesive composition made according to Example No. 1, thirty (30) parts of coating clay may be added; to the adhesive made according to the formula given in Example No. 2, thirty (30) parts of dry color such, for example, as red turkey umber, ultramarine blue or ferrite yellow may be added; and to the adhesive prepared according to the formula given in Example No. 3, twenty (20) parts of lithopone may be added, together with 0.5 part of a forty per cent (40%) solution of formaldehyde, in order to increase the water resistant properties of the resulting product.

In place of the ammonium resinate solvent which results from mixing a suitable resin, such as wood rosin in, a water solution of ammonia, as specified above, other alkaline resinates may be used as the solvent or emulsifying agent for the corn protein base adhesive and among such alkaline resinates are sodium resinate and potassium resinate, and, in place of ammonia, ammonium linoleate may be used for the purpose of introducing the (NH₄) radical into the resin solution and sodium or potassium linoleate may be used, if desired, for the purpose of introducing either sodium or potassium ions into the resin solution. However, nothing has been found which can be used in place of the ammonium resinate or other alkaline resinates as the emulsifying agent, that is, for the purpose of putting the corn protein base material or meal into the form of a colloidal solution or suspension, and it is believed that the step of so doing, and the method by which this is accomplished, are new in the art.

As stated above, the strong alkalis, such as sodium hydroxide and potassium hydroxide can be used, if desired, but they are less desirable than ammonium hydroxide for the purpose of making the desired alkaline resinate emulsion because they tend to give the resulting adhesive a darker color than that which results when ammonium hydroxide is used, and hence ammonium resinate is the preferred emulsifying agent because it gives the resulting adhesive a desirable lighter color than that which results when either sodium resinate or potassium resinate is used as the emulsifying agent.

It is to be noted, in connection with the present adhesive and the aforesaid method of making the same, that other protein base materials and meals such, for example, as soya bean meal, peanut meals, and others, can not be substituted for the corn protein adhesive base or meal which is used in the manufacture of the present adhesive, because the essential and necessary step of heating the present material up to a temperature of from 170° F. to 210° F. as described above, to put the coloring material contained in the corn protein adhesive base, and including the naturally occurring substances chlorophyll and anthocyanin, in a condition wherein they are attacked by common and familiar bleaching agents, such as hydrogen peroxide, will react detrimentally upon the adhesive proteidal substances which are present in soya bean meal, peanut meal, and the like, and initiate undesired hydrolysis in the same, and thus lessen their adhesive properties, but such heating has no detrimental effect upon the adhesive properties of the corn protein adhesive base which is used in making the present adhesive.

In addition to being especially adapted for use as a liquid adhesive in the wall paper and other analogous coating arts, as well as for use as an adhesive, in general, the adhesive provided by the present invention may also be manufactured and used as a dry adhesive base, to be later mixed with water to form a liquid adhesive. Thus, a satisfactory dry adhesive base embodying this phase of the present invention may be made according to the formula represented by the following example, in which all parts indicated are by weight:

*Example No. 4*

|  | Parts |
|---|---|
| Corn-gluten meal | 100 |
| Wood rosin | 20 to 60 |
| Caustic soda | 5 to 15 |

The composition made according to the formula represented by the foregoing Example No. 4 may be manufactured and sold in dry form and mixed at the place of use with from 100 to 400 parts of water, whereupon the liquid thus made may be heated and bleached in the manner hereinbefore described, and used in any of the ways hereinbefore set forth, as well as in other ways.

It should also be noted, in this connection, that in place of the wood rosin and caustic soda set forth in Example No. 4, above, any dry alkaline resinate such, for example, as sodium or potassium resinate, may be used as, and so as to form, the necessary emulsifying agent, when the dry adhesive base thus prepared is later mixed with water.

It will be seen, therefore, from the foregoing description, that the present invention accomplishes its aforesaid intended objects, and other objects, and provides a new corn protein liquid and dry adhesive base which, while being capable of use as an adhesive, in general, are especially adapted for use in the manufacture of wall paper, and in analogous paper coating arts, for holding coloring materials, pigments, inks and the like upon wall paper, and especially white wall paper, as well as upon wall papers and other papers having light colors and shades of color.

It will also be seen from the foregoing description of the present invention that the same provides a new method of making a corn protein adhesive, and which method includes the steps, believed to be novel, of putting the corn protein adhesive into the form of a solution or colloidal suspension by using an ammonium resinate or other alkaline resinate and removing the objectionable dark color from the resinate emulsion thus formed by heating the same to a temperature of from approximately 170° F. to approximately 210° F., inclusive, depending upon the particular resin used, and finally bleaching the adhesive composition thus formed and treated.

While it may be disputed as to whether or not it is entirely correct to refer to ammonia and the (NH₄) radical or ion as an alkali, it is contemplated and intended that the terms "alkali" and "alkaline" as used herein, and as used hereinafter in the claims, are intended to and do include not only the true alkalis such as sodium and potassium hydroxide, and equivalent substances, but also ammonia and the (NH₄) radical or ion.

The term "corn protein" as used hereinbefore, and as used hereinafter in the claims, refers not only to a corn protein adhesive base material, such, for example, as corn gluten meal which includes or contains both the alcohol-soluble corn proteins or prolamines and the alkali-soluble corn proteins or globulins, but it is also intended to and does include the alcohol-soluble corn proteins or prolamines, per se.

While I have illustrated and described preferred compositions and the preferred method for carrying my invention into effect, these are capable of variation and modification, without departing from the spirit of the invention. I, therefore, do not wish to be limited to the precise details of the composition and method set forth, but desire to avail myself of such variations and modifications as come within the scope of the appended claims.

I claim:

1. The method of making an adhesive which comprises forming a dispersion of water substantially free of alcohol or other organic solvent, a corn protein base in sufficient quantity to impart adhesive properties to the resulting composition, and an alkaline resinate, then heating the dispersion thus prepared to a temperature not substantially lower than 170° F. nor substantially higher than 210° F., and then adding a bleaching agent to the dispersion thus prepared, at the temperature stated.

2. The method of making an adhesive which comprises forming a dispersion of water substantially free of alcohol or other organic solvent, a corn protein base in sufficient quantity to impart adhesive properties to the resulting composition, and an alkaline resinate, then heating the dispersion thus prepared to a temperature not substantially lower than 170° F. nor substantially higher than 210° F., and then adding hydrogen peroxide as a bleaching agent to the dispersion thus prepared and heated.

3. The method of forming an adhesive which comprises forming a dispersion of water substantially free of alcohol or other organic solvent, a corn protein base in sufficient quantity to impart adhesive properties to the resulting composition, and one or more substances selected from the group consisting of ammonium resinate, sodium resinate, and potassium resinate, then heating the dispersion thus prepared to a temperature not substantially lower than 170° F. nor substantially higher than 210° F., and then adding a bleaching agent to the dispersion thus prepared, at the temperature stated.

4. The method of making an adhesive which comprises forming a dispersion of water substantially free of alcohol or other organic solvent, a corn protein base in sufficient quantity to impart adhesive properties to the resulting composition, a resin, and one or more substances selected from the group consisting of the hydroxides and linoleates of sodium, potassium and the ammonium, or (NH4) ion, then heating the dispersion thus prepared to a temperature of not substantially lower than 170° F. nor substantially higher than 210° F., and then adding a bleaching agent to the dispersion thus prepared and heated.

5. The method of making an adhesive which comprises forming a dispersion of water substantially free of alcohol or other organic solvent, a corn protein base in sufficient quantity to impart adhesive properties to the resulting composition, a resin, and one or more substances selected from the group consisting of the hydroxides and linoleates of sodium, potassium and the ammonium, or (NH4) ion, then heating the dispersion thus prepared to a temperature of not substantially lower than 170° F. nor substantially higher than 210° F., and finally adding hydrogen peroxide as a bleaching agent to the dispersion thus prepared and heated.

6. A method of making an aqueous adhesive composition which is particularly adapted for use in the manufacture of wall paper and other coated paper products, said method comprising mixing a major portion of water, substantially free of alcohol or other organic solvent, with a relatively smaller portion of a corn protein in a quantity sufficient to impart adhesive properties to the resulting mixture, incorporating with the mixture thus formed one or more dispersing agents selected from the group consisting of the resinates and linoleates of sodium, potassium and the ammonium (NH4) ion, heating the composition thus formed to a temperature of not substantially lower than 170° F. nor substantially higher than 210° F., and then adding a bleaching agent to the said composition, at the temperature stated, so as to bleach the natural dark color of the said corn protein and thus adapt the adhesive composition thus prepared for use as an adhesive in the manufacture of wall paper and other coated paper products.

JOHN W. CLOSE.